Oct. 19, 1965  E. I. MOSER  3,213,414
ACOUSTIC TRANSDUCER WITH PRESSURE EQUALIZING COVER
Filed Aug. 27, 1962  3 Sheets-Sheet 1

INVENTOR.
EDWARD I. MOSER
BY
Brumbaugh, Free, Graves & Donohue
his ATTORNEYS

Oct. 19, 1965
E. I. MOSER
3,213,414
ACOUSTIC TRANSDUCER WITH PRESSURE EQUALIZING COVER
Filed Aug. 27, 1962
3 Sheets-Sheet 2
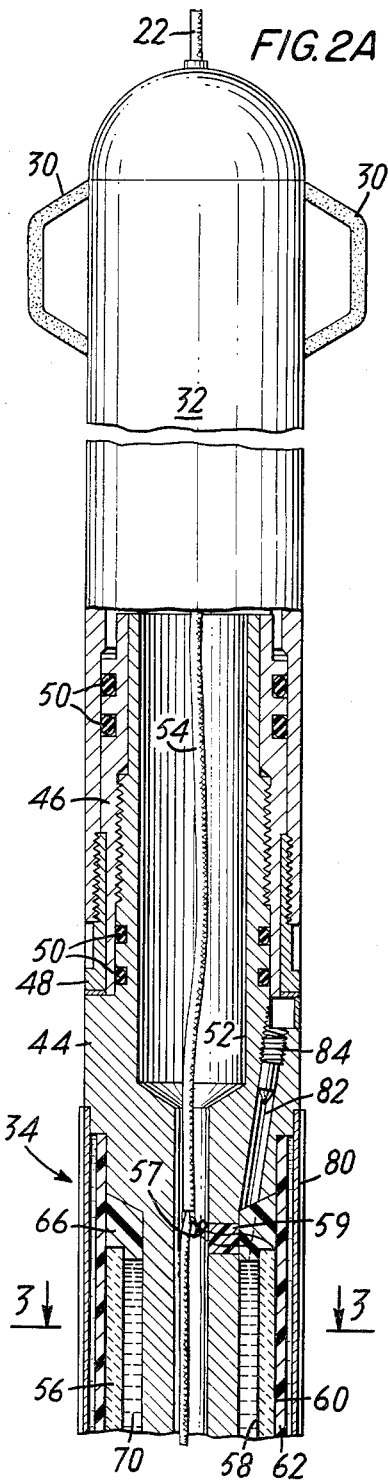
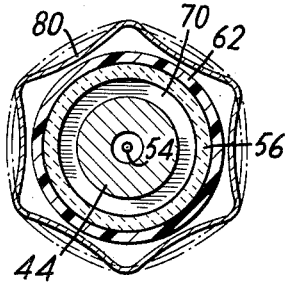
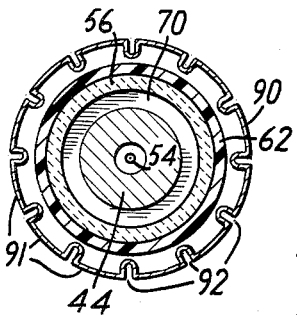
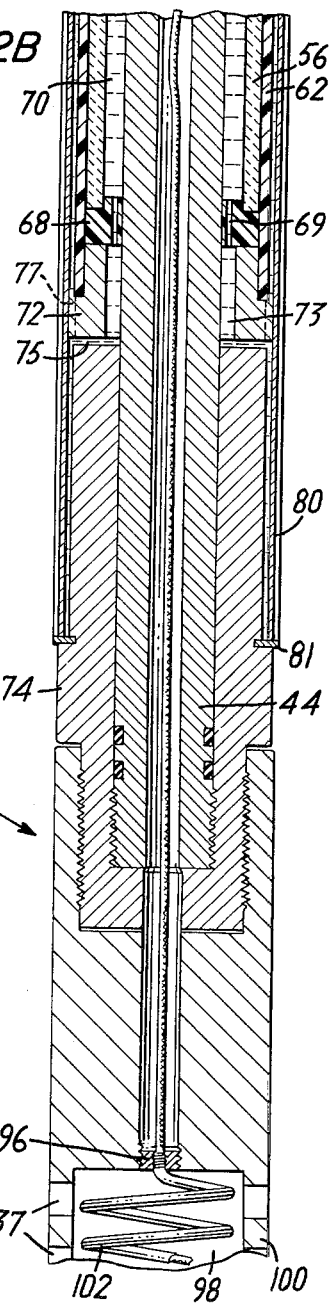
INVENTOR.
EDWARD I. MOSER
BY
Brumbaugh, Free, Graves & Donohue
his ATTORNEYS

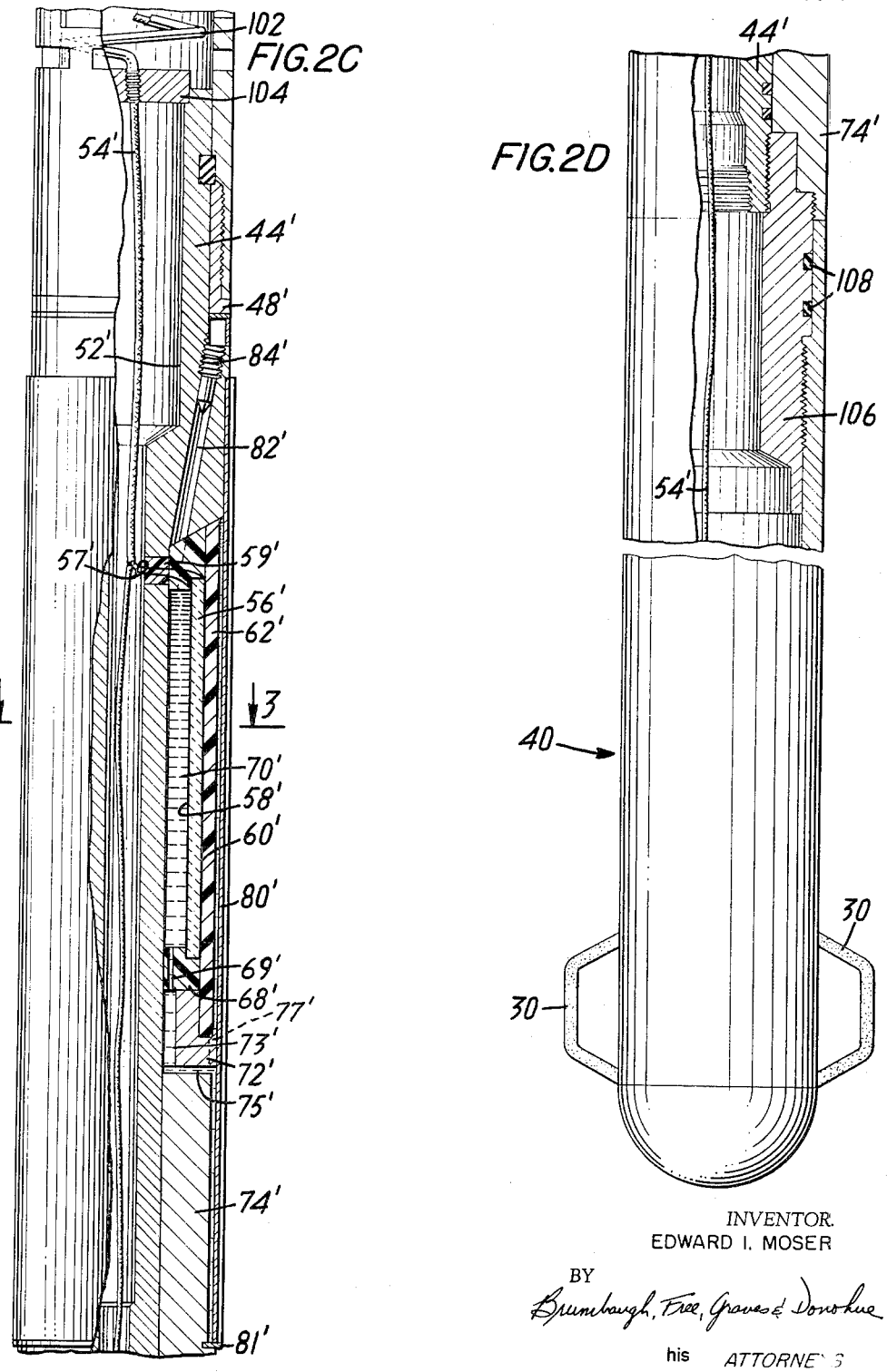

United States Patent Office

3,213,414
Patented Oct. 19, 1965

3,213,414
ACOUSTIC TRANSDUCER WITH PRESSURE EQUALIZING COVER
Edward I. Moser, Houston, Tex., assignor to Schlumberger Well Surveying Corporation, Houston, Tex., a corporation of Texas
Filed Aug. 27, 1962, Ser. No. 219,566
9 Claims. (Cl. 340—17)

This invention relates to apparatus for well logging, and more particularly to means for subterranean investigation utilizing acoustic energy.

Various techniques for investigating geological formations by means of acoustic waves transmitted therethrough have been devised. In general, these techniques involve the generation of an acoustic wave, usually in the form of a relatively short duration impulse, and the measurement of the amplitude and/or travel time characteristics of the wave through preselected areas adjacent the borehole. These measurements provide valuable information useful in establishing the character and the constituents of the formations traversed by the borehole.

One specific area of investigation in which acoustic techniques have been found particularly advantageous is in what is termed cement bond logging. Once an oil bearing stratum, or strata, has been located along the borehole, it is desirable to isolate the production zone of the formation from other zones which may bear fluids, thereby to prevent mixture of these fluids with the oil. The sealing is accomplished by completely filling the gap between a well casing disposed in the borehole and the surrounding formations with cement.

If the sealing is complete and effective, the cement will bond firmly to the well casing. To determine the effectiveness of the bond, acoustic signals are transmitted along the length of the casing and the intensity thereof measured after a fixed distance of travel. If the cement is firmly bonded to the casing over the area of the measurement, the signal intensity is considerably decreased. On the other hand, if the bond is poor, relatively little decrease in signal intensity results. A cement bond log of the entire well bore may be made by moving a sonde having a transmitter and receiver spaced apart thereon through the length of the casing as the measurements are being made.

In all types of acoustic well logging processes, the logging tool or sonde usually comprises an acoustic transmitter and one or more acoustic receivers mounted in fixed, spaced apart relation to each other for concurrent movement through the well bore. Both the transmitter and receiver units generally include a piezoelectric or magnetostrictive element which, in the case of the transmitter, is actuated in response to electrical impulses applied thereto to generate acoustic waves, and which, in the case of the receiver, is responsive to an impinging acoustic wave to generate an electrical output signal. In both cases, it is necessary that the transducer elements be efficiently coupled to the material under investigation and, at the same time, be carefully protected from the deleterious effects of the liquids and gases present in the borehole. These requirements must be satisfied over wide variations in pressure as the tool travels along the well bore or casing, requiring pressure equalization means to permit proper operation of the transducers, as well as complete protection from the surrounding fluids.

In prior art devices, flexible elastomer covers were provided to enclose the transducer elements in an oil to seal them against the fluids in the borehole and to provide a degree of pressure equalization. However, while these materials were liquid tight, they did not prevent gases from permeating under the high pressure conditions encountered in the borehole and going into solution in the oil. Hence, when the logging tool was withdrawn from the well bore, the gases were unable to escape at a rate sufficient to prevent bursting of the cover. As a further drawback, earlier types of logging tools were difficult to repair because of the techniques employed to seal them against well fluids and to provide the pressure equalization between internal and external pressures necessary for effective operation of the transducer.

Accordingly, it is the primary object of the present invention to provide improved acoustic well logging apparatus capable of efficient and accurate operation under all types of conditions encountered in well bores.

A further object of this invention is to provide an improved well logging tool for acoustic well logging purposes.

Still another object of this invention is to provide an improved acoustical transducer unit suitable for use as both transmitter and receiver in well logging apparatus.

An additional object of the present invention is to provide an improved pressure equalization arrangement for use with a transducer operating under varying ambient pressures.

A still further object of the present invention is to provide an improved well logging tool having readily separable acoustic transmitter and receiver units, each of which is individually sealed against the action of the liquids and gases encountered in a well bore.

In accordance with the present invention, an acoustic transmitter and an acoustic receiver are mounted on the well logging tool in spaced apart relation. Each of the transmitter and receiver units includes a central supporting mandrel around which is disposed a generally cylindrical member of piezoelectric or magnetostrictive material. The diameter of the mandrel with respect to the transducer member is such as to provide an annular cavity therebetween, which is filled with an electrically non-conductive liquid such as silicone oil which is relatively incompressible.

The transducer members are surrounded with a relatively tight-fitting sleeve of Teflon or other insulating material. Finally, the entire transducer structure is sealed within an outer sleeve of relatively thin stainless steel or other noncorrosive and relatively impermeable material. The elasticity of the thin sleeve permits the pressure balancing as well as transfer of acoustic energy.

As noted hereinabove, in order to permit effective operation of the transducer element under varying pressures, it is necessary that the pressures interiorly and exteriorly of the cylindrical transducer member be substantially equal. In the present case, this is accomplished by fabricating the stainless steel cover plate in the form such that its surface can flex inwardly or outwardly depending upon the relative pressures on either side thereof. The cover plate is extended beyond the transducer member itself and is spaced from the supporting mandrel to provide an extension of the cylindrical oil-filled cavity in the transducer. This chamber is likewise filled with oil. The sleeve is sealed at its upper and lower ends against the admission of liquids and gases. As the external pressure increases, such as when the logging tool is being lowered into the well bore, the cover plate is effectively compressed to decrease the volume of the enclosed chamber and thereby compress the liquid filling it. Upon a decrease in external pressure, the liquid in the cavity assumes a pressure essentially equal to the outer pressure.

The flexible outer covering can be made in varying forms. In one embodiment it is polygonal in cross-sectional shape and each side thereof functions similarly to the bottom of a flexible oil can, to thereby change the cross-sectional area as the external pressure changes. Another embodiment has a cross-sectional shape consisting of a plurality of arcuate segments separated by narrow, infolding hinge portions which permit an overall constriction or expansion of the cover in response to varying pressures.

The foregoing and other objects, advantages, and features of the invention will become more readily apparent from the following more detailed description thereof, when taken in conjunction with the accompanying drawings, in which:

FIGURE 1 is a cross-sectional view through a borehole in the earth showing the well logging tool of the invention in operative position;

FIGURES 2A through 2D together are a partial cross-section through the well logging tool showing the inner construction thereof;

FIGURE 3 is a cross-section of the logging tool of the invention taken along the lines 3—3 of FIGURE 2A and FIGURE 2C;

FIGURE 4 is a cross-section of the logging tool taken along the lines 3—3 of FIGURE 2A showing an alternate construction of the outer covering;

Figure 1:
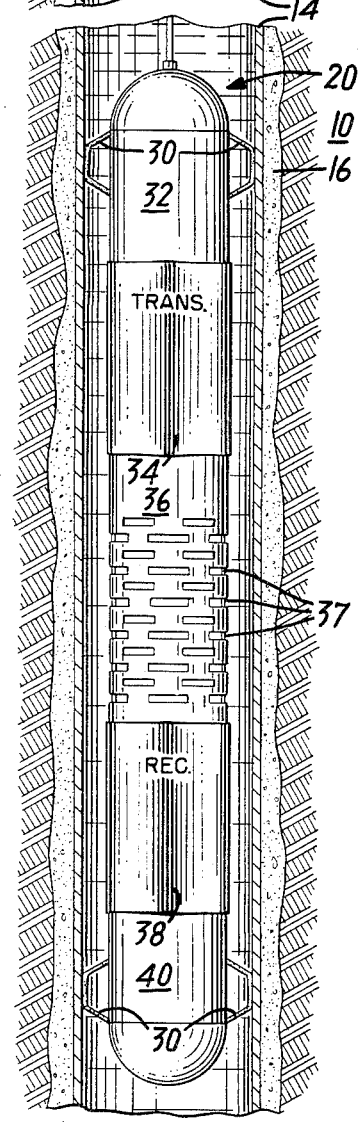

For illustrative purposes, the invention will be described in connection with its use in a cement bond logging operation, although it is to be understood that it is equally advantageous when applied to other acoustic logging functions. In FIGURE 1, a borehole 12 is shown traversing the earth formations 10. The borehole 12 is provided with a steel casing or liner 14, in well known fashion. A layer of cement 16 fills the space turn rate of the craft.

between the casing and the formations to seal the latter against admixture of the various fluids contained therein. The casing is filled with the usual borehole fluid 13. In the cement bond logging example to be described, the logging tool provides indications of the quality of the bonding of the cement layer 16 to the casing 14.

The logging tool, indicated generally at 20, is moved through the borehole 12 by a cable 22, which is drawn over a sheave 24 and wound on cable drum 26 at the surface of the earth. In addition to supporting the logging tool 20 as it traverses the borehole, the cable 22 carries one or more electrical conductors for carrying electrical signals from the logging tool to the recorder 28 at the surface of the earth and electrical power from the surface to the tool. The electrical signals may be coupled from the cable through slip rings or the like on the drum 26 to the recording apparatus.

As shown in FIGURE 1, the logging tool 20 comprises an elongated, generally cylindrical body adapted to move freely through the borehole 12. At the upper and lower ends of the tool are provided a plurality of spaced centralizing elements 30, which, for example, may be of rubber and maintain the tool centrally located within the borehole without interfering with its freedom of movement therethrough.

The logging tool itself is divided generally into a plurality of separate portions. Upper segment 32 contains the electronic circuitry carried by the tool, which will be described hereinafter in connection with FIGURE 5. Beneath this section are the transmitter portion 34 and receiver portion 38, spaced from one another by an acoustic energy isolating section 36. The latter is supplied with staggered horizontal slots 37 which serve to break up any direct acoustic transmission path through the tool structure itself, so that no significant directly transmitted signal will reach the receiver until long after the desired signal has been received.

At the lower end of the tool 20 is disposed a conventional casing collar locator 40 of any suitable type. For example, the apparatus 40 may consist of a magnetic arrangement which utilizes the casing 14 as part of a magnetic circuit. When the tool passes a casing collar joining two abutting sections of the well casing, the properties of the magnetic circuit will change, providing an indication which is transmitted to the surface of the earth. These indications provide a depth reference for the log plot.

Turning now to FIGURES 2A and 2B, which when arranged vertically in end-to-end relation illustrate the upper half of the tool 20, a stainless steel mandrel 40 threadedly engages at its upper end an adapter sleeve 46. A split ring element 48 surrounds the adapter 46 and is provided with a threaded portion at its upper end to engage the end portion of the housing enclosing the electronic circuit segment 32 of the apparatus. With the upper portion 32 screwed tightly to the split ring coupler 48, the latter firmly engages the adapter 46 and thus rigidly connects the portion 32 to the mandrel 44. Suitable sealing rings 50 may be provided between the several cylindrical members to make the connections therebetween fluid tight.

The mandrel 44 is provided with an axial bore 52 extending completely therethrough for accommodating the electrical conductors 54 connected to the various components of the tool, i.e., the casing collar locator 40, the receiver 38, and the transmitter 34.

The transmitting and receiving transducers are substantially identical in form. The former is shown in FIGURES 2A and 2B and comprises a cylindrical sleeve member 56 of a material, such as barium titanate ceramic, capable of transducing electrical signals into mechanical or acoustic vibration. Conversely, in the case of the receiver shown in FIGURE 2C, the corresponding element will convert mechanical or acoustic vibrations into electrical signals. The ceramic sleeve 56 is provided with inner and outer conductive coatings 58, 60, respectively, which are connected by leads 57 to the conductor 54, through a hermetically sealed, pressure tight plastic interconnector 59 in the mandrel 44. Annular support rings 66, 68 of a nonconducting material such as Teflon plastic, support the ceramic sleeve 56 at its upper and lower ends respectively, in spaced relation to the mandrel 44, leaving an annular cavity 70 therebetween.

Surrounding the ceramic sleeve 56 is a non-conductive tubular member 62, which may also be made of Teflon, and which is in close contact with the outer surface of the ceramic member. An annular steel ring 72 surrounds the mandrel 44 to provide a lower support for the Teflon spacer 62 and the bottom support ring 68.

Threaded to the bottom end of the mandrel 44 is a spacer sleeve 74 which extends along the length of the mandrel substantially to the steel ring 72. The outer surface of the sleeve 74 is provided with a shoulder part way therealong, above which its exterior diameter is reduced.

The entire transducer structure described above is enclosed within a flexible outer covering 80 of stainless steel or other noncorrosive and impermeable material. The covering 80 is secured at its upper end in fluid-tight engagement within the thickened portion of the mandrel 44, and at its lower end in similar fluid-tight relation to the sleeve 74. A snap-ring 81 is provided to facilitate removal of the sleeve when desired. As will be seen hereinafter in connection with the discussion of FIGURES 3 and 4, the internal dimensions of the sleeve 80 are such that a narrow space will always be left between it and the outer surface of the Teflon spacer 62, as well as around the sleeve 74.

The lower Teflon support ring 68 is provided with a plurality of openings 69 therein communicating with the annular cavity between the ceramic member 56 and mandrel 44. Corresponding openings 73 in the steel ring 72 are provided to extend the fluid flow path therefrom into the narrow space 74 between the ring 72 and the upper end of the sleeve 74. Openings 77, shown in dotted lines, are also provided in the ring 72 to communicate with the space between the spacer 62 and the cover 80. A continuous fluid flow path is thereby provided between the cavity 70 and the relatively narrow gaps between the outer covering 80 and the inner members of the unit.

As seen in FIGURE 2A, the mandrel 44 is provided with a bore 82 communicating with the upper end of the cavity 70. A plug 84 is threadedly received in the upper end of the bore 82 to provide a fluid-tight seal when inserted. The bore 82 provides access for filling the entire chamber comprising the cavity 70, passages 69, 73 and 75, and the annular spaces between the spacer 62, the sleeve 74 and the cover 80, with a liquid such as silicone oil. In practice, this chamber would be filled by disassembling the transducer element from the remainder of the apparatus, removing the plug 84 to open the bore 82, and then immersing the entire unit into a pool of oil. The plug 84 is inserted before withdrawal to maintain the oil within the transducer. The unit is then reassembled with the other apparatus.

As explained briefly hereinabove, the outer covering 80 is made of a form to permit pressure equalization between inner and outer surfaces of the ceramic transducer element. FIGURE 3 illustrates in cross section the configuration of the transducer covering shown in FIGURES 2A, 2B, and 2C. This section is taken through the transducer portion and shows the mandrel 44, the ceramic sleeve 56, the Teflon spacer 62 and the outer cover 80. The annular cavity 70 surrounds the mandrel 44 and the conductor 54 are also shown.

The outer covering 80 is shown to be polygonal in cross section, in the illustration shown, a hexagon, with each of the sides thereof slightly greater in length than the straight line distances between the respective corners. This permits the sides to flex between the innermost or compressed position shown in solid lines, when external pressure is greater than the internal pressure, and the outer expanded position shown in dotted lines, when the pressure of the fluid filling the cavity 70 is greater than that of the surrounding bore-hole fluid. Of course, depending upon the relative pressures, the sections of the covering 80 may assume intermediate positions between the expanded and compressed limits. The operation of the member 80 may be likened to that of the familiar oil can wherein the volume of the chamber enclosed is varied without stretching the metal. As will be realized, when the relative pressures are such as to compress the cover 80, the resultant decrease in enclosed volume increases the internal pressure at the transducer to equal the pressure of the borehole fluid. A lower external pressure increases the volume, thereby lowering the internal pressure.

An alternate form of the outer covering is shown in FIGURE 4. The latter view is also taken through the transducer portion of the device and includes the same inner elements as in FIGURE 3. The outer covering however is somewhat different in configuration. As shown therein the cover 90 includes a plurality of arcuate segments 91 joined to each other by infolding hinge portions 92. The latter enable the arcuate sections 91 to be drawn together as a result of an increase of external pressure or to separate upon a decrease of external pressure. The result is to vary the total volume of the liquid contained within the transducer unit and thus equalize the internal and external pressures.

The lower end of the sleeve 74 is provided with a threaded portion for engaging the upper end of the isolating section 36. Both the sleeve 74 and the upper end of the isolating section 36 are provided with axial bores aligned with the bore 52 in the mandrel 44 to allow the conductors 54 to pass therethrough. The lower end of the bore in the section 36 is provided with a sealing plug 96 to prevent the entry of borehole fluid.

Although broken away for the sake of convenience of illustration in FIGURES 2B and 2C, the isolating section 36 is of considerable length relative to the size of the transmitter and receiver, as is apparent from FIGURE 1. The greater part of the length of section 36 is provided with an enlarged central bore 98 (FIGURE 2B) having a relatively thin outer wall 100. The latter is provided with a plurality of staggered transverse slots 37 therethrough, as seen best in FIGURE 1. These slots serve to breakup any direct acoustic transmission path for sound signals through the tool itself and effectively delay such transmission for a period of time sufficient to permit the desired signals coming from the formations or casing to reach the receiver without interference.

The conductors 54 pass through the filling plug 96 and into a spiral conduit 102 which may be made of any non-corrosive material, such as stainless steel. The spiral extends the entire length of the enlarged chamber 98, terminating at the upper end of the receiver portion, as shown in FIGURE 2C. In addition to protecting the conductors from the corrosive effects of the borehole fluid which fills the chamber 98, the spiral conduit is also capable of absorbing pressure and temperature variations encountered within the borehole without straining adjacent fittings or components of the tool. Moreover, its increased length serves to delay the propagation of any acoustic energy that might be directly coupled thereto for a sufficient time to render it non-interfering at the receiver.

The receiver portion 38 is illustrated in FIGURE 2C and is substantially identical to the transmitter portion 34 in structural detail and mode of operation. Corresponding parts thereof are indicated by the same numerals with a prime (′) added to distinguish therebetween. The operation of the transducer unit 56′ and the pressure equalization function of the outer covering 80′ is identical to that of its counterparts in FIGURES 2A and 2B and repetition thereof is believed unnecessary.

The lower end of the spiral conduit 102 is coupled to a sealing plug 104 at the upper end of the mandrel 44′ to provide a fluid-tight connection therebetween. Conductors 57′ are coupled to respective inner and outer layers 58′, 60′ on the ceramic transducer element 56, while the remaining conductors 54′ pass through the axial bore 52′ to the casing collar locator portion 40 of the tool (FIGURE 2D). The latter is coupled to the lower end of the sleeve 74′ by means of a coupling member 106 which engages the sleeve 74′ and the mandrel 44′ at its upper end, and the exterior housing of the casing collar locator portion at its lower end. Suitable sealing rings 108 may be provided in the respective areas of the contact.

With the tool in readiness for operation, the transmitter and receiver sections are filled with oil, as described above, while the inner bores 52, 52′ of the respective mandrels, contain air at atmospheric pressure. The various seals provided in the tool maintain the respective oil and air pressures and prevent fluid leakage between the various members of the apparatus.

Figure 5:
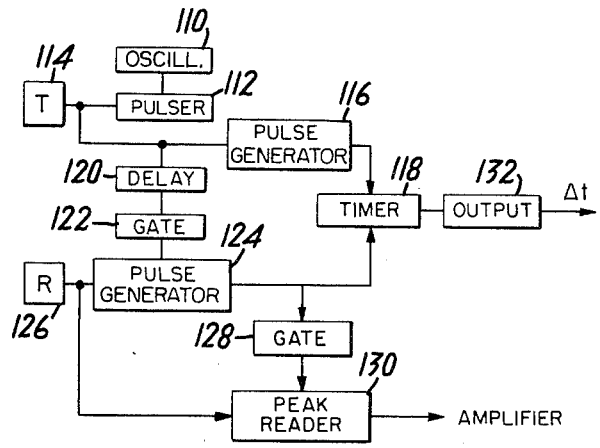
FIGURE 5 is a block diagram of the electrical circuitry of the acoustic logging apparatus when used for cement bond logging.

FIGURE 5 illustrates a typical circuit for performing a cement bond log, which circuit would be carried by section 32 of the logging tool 20. An oscillator 110 controls a pulser 112 to produce train of high power, accurately spaced pulses. The latter are supplied to the acoustic transmitter 114, included within the transmitter portion 34, to generate the acoustic pulses in the borehole. The acoustic energy thereby developed is coupled through the fluid filling the borehole into the well casing 14 and thence downward through the casing towards the receiver portion 38.

The pulser 112 also actuates the pulse generator 116, whose output is used to initiate the cycle of a timer 118. As can be seen from the wave forms in FIGURE 6, the timer commences its operation substantially simultaneously with the initiation of the transmitted acoustic impulse T.

Figure 6:
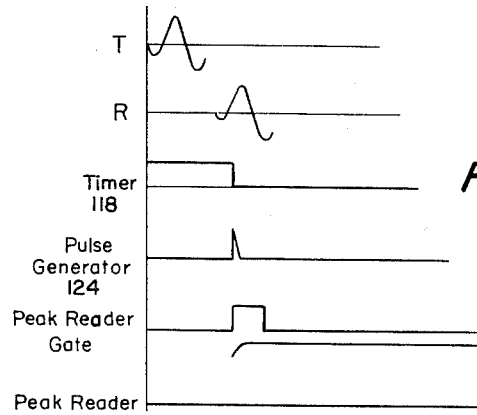
FIGURE 6 is a series of wave forms useful in the explanation of the operation of the circuit of FIGURE 5.

The pulser output is also supplied through the delay means 120 and a gate 122 to a pulse generator 124. The delay provided by unit 120 is adjusted to actuate the gate 122 just prior to the earliest expected pulse at the receiver R. Thus, a received pulse will be effective to actuate the pulse generator 124 to provide a single sharp pulse, as indicated in FIGURE 6.

The output of pulse generator 124 is connected to the timer 118 to terminate its cycle, and also to the gate 128. The function of the latter is to render the peak reader 130 operative for a gate interval sufficient to accommodate the first significant peak of the received signal. The latter is coupled directly from the receiver 126 to the input of the peak reader 130. The output of the peak reader is coupled through an amplifier to the recorder 28 at the surface of the earth. Similarly, the output of the timer, which is indicative of the elapsed time between the transmitted pulse and the received pulse, $\Delta t$, is also coupled through a suitable output network 132 to the recorder 28 at the surface.

From the foregoing discussion of the cement bond logging technique, it will be apparent that the amplitude of the received acoustic signal, as represented by the output of the peak reader 130, is indicative of the character of the bond between the cement 16 and the well casing 14, at the level at which the measurement is being taken. These amplitudes are recorded against depth in the well, which may be established either by the casing collar locator 40, or apparatus associated with the cable drum 26 at the surface. As previously indicated, if the cement bond is good, the acoustic signal will be substantially attenuated and the output of the peak reader will be relatively low. Should an area of unsatisfactory bonding be encountered, the attenuation will decrease and a higher amplitude output signal will result.

The purpose of the $\Delta t$ measurement is to give added reliability to the recorded results. For example, if the signal received at receiver 126 is of insufficient amplitude to trigger the pulse generator 124, this factor will be indicated by the increased length of the $\Delta t$ measurement. Normally, pulses should be received at repetitive, equally spaced intervals corresponding to the frequency of the pulser 112, and the output of the timer 118 should be the same for each received pulse. However, if the received signal is lost, either through attenuation in the surrounding media or by malfunction of one of the circuit elements, one or more cycles may be skipped. This is indicated by the timer output which will then show a longer time interval between received pulses and thereby alert the operator. Continuous and extended cycle skipping could be indicative of a malfunction in the apparatus.

It will be seen from the foregoing that an improved well logging tool has been described which avoids many of the drawbacks of presently known devices. By means of the novel flexible outer covering, pressure equalization is achieved without the necessity for unreliable sliding seals between various parts. Moreover, the covering eliminates the hazard of infiltration of gases and fluids into the internal structure of the device. Since the outer covering is of a noncorrosive material, deterioration of this member is avoided. As an additional feature, the various portions of the tool are readily disconnectable from one another to permit ease of cleaning and repair of all the constituent parts.

Although discussed in connection with an application for cement bond logging purposes, it will be realized that the principles of the invention may be applied to other acoustic logging techniques and the invention is not to be limited in scope except as provided by the appended claims.

I claim:

1. An electroacoustic transducer for use in a well bore or the like which contains a medium of varying pressure, comprising a supporting mandrel, a cylindrical element of electroacoustic transducing material mounted in surrounding relationship to said supporting mandrel to define an annular cavity therebetween, a cylindrical spacer of non-conducting material surrounding said element, a flexible, impermeable covering means surrounding said spacer and sealed at both ends thereof to said mandrel to provide a fluid-tight chamber including said annular cavity, the outer surface of said covering means being exposed to the pressure of said medium, said covering means being capable of varying its enclosed volume in accordance with the pressures applied thereto, and a liquid under pressure completely filling said chamber, whereby the pressure of said medium is communicated to the liquid filling said cavity.

2. An electroacoustic transducer for use in a well bore or the like which contains a medium of varying pressure, comprising a supporting mandrel having a central bore therethrough, a cylindrical element of piezoelectric material mounted in surrounding relationship to said supporting mandrel to define an annular cavity therebetween, respective films of electrically conductive material on the inner and outer surfaces of said piezoelectric element, conducting leads connected to said films and coupled through a fluid-tight seal in said mandrel to its central bore, an annular spacer of non-conducting material surrounding said element and in contact with said outer film of conductive material, a flexible, metallic sleeve surrounding said spacer in spaced relation thereto and sealed to said mandrel at its upper and lower ends to provide a fluid-tight chamber including said annular cavity, the outer surface of said sleeve being exposed to the pressure of said medium, said sleeve being capable of varying its enclosed volume in response to pressures applied thereto, and a liquid under pressure completely filling said chamber, whereby the volume enclosed by the sleeve is varied to equalize the inner and outer pressures of said chamber.

3. An electroacoustic transducer for use in a well bore or the like which contains a medium of varying pressure, comprising a supporting mandrel, a cylindrical element of electroacoustic transducing material mounted in surrounding relationship to said supporting mandrel to define an annular cavity therebetween, an annular spacer of non-conducting material surrounding said element, a flexible, impermeable metal sleeve surrounding said spacer and sealed at its upper and lower ends to said mandrel to provide a fluid-tight chamber including said annular cavity, the outer surface of said sleeve being exposed to the pressure of said medium, said sleeve being capable of varying its enclosed volume in accordance with the pressures applied thereto, and a liquid under pressure completely filling said chamber, whereby the pressure of said medium is communicated to the liquid filling said cavity.

4. A well logging tool adapted to be passed through a fluid-filled borehole traversing earth formations comprising an acoustic transmitter portion, an acoustic receiver portion, means providing a relatively low velocity path for acoustic signals connected between said transmitter and receiver portions, the respective connections being readily releasible to permit removal of said portions, each of said transmitter and receiver portions including an electroacoustic transducer element, a cavity adjacent said element filled with a liquid, and a flexible, impermeable metallic sleeve having a polygonal cross-section with the length of each side being slightly greater than the straight-line distance between the respective corners substantially entirely encompassing said portion and sealing said cavity, said sleeve being adapted to be exposed to the pressure of the fluid in the borehole when the tool is fully assembled, whereby pressures applied to the exterior of said covering are communicated to the liquid filling said cavity.

5. A well logging tool adapted to be passed through a fluid-filled borehole traversing earth formations comprising an acoustic transmitter portion, an acoustic receiver portion, means providing a relatively low velocity path for acoustic signals connected between said transmitter and receiver portions, the respective connections being readily releasible to permit removal of said portions, each of said transmitter and receiver portions including an electroacoust transmitter element, a cavity adjacent said element filled with a liquid, and a flexible impermeable metallic sleeve having a cross-section comprised of a plurality of arcuate segments joined by narrow, inwardly folded hinge portions substantially entirely encompassing said portion and sealing said cavity, said sleeve being adapted to be exposed to the pressure of the fluid in the borehole when the tool is fully assembled, whereby pressures applied to the exterior of said covering are communicated to the liquid filling said cavity.

6. An electroacoustic transducer comprising supporting means, an element of electroacoustic transducing material, means mounting said element in spaced relation to said means to provide a cavity therebetween, a flexible metal sleeve enclosing said element and sealed at both ends to said supporting means, said sleeve having a polygonal cross-section with the length of each side being slightly greater than the straight-line distance between the respective corners, and a liquid filling said cavity and the interior of said sleeve, whereby pressures applied to the exterior of said covering are communicated to said liquid.

7. An electroacoustic transducer comprising supporting means, an element of electroacoustic transducing material, means mounting said element in spaced relation to said means to provide a cavity therebetween, a flexible metal sleeve enclosing said element and sealed at both ends to said supporting means, said sleeve having a cross-section comprised of a plurality of arcuate segments joined by narrow inwardly folded hinge portions, and a liquid filling said cavity and the interior of said sleeve, whereby pressures applied to the exterior of said covering are communicated to said liquid.

8. An electroacoustic transducer for use in a well bore or the like which contains a medium of varying pressure, comprising a supporting mandrel, a cylindrical element of electroacoustic transducing material mounted in surrounding relationship to said supporting mandrel to define an annular cavity therebetween, an annular cavity spacer of non-conducting material surrounding said element, a flexible, impermeable metal sleeve surrounding said spacer and sealed at its upper and lower ends to said mandrel to provide a fluid-tight chamber including said annular cavity, said sleeve having a polygonal cross-section with the length of each side being slightly greater than the straight-line distance between the respective corners, the outer surface of said sleeve being exposed to the pressure of said medium, and a liquid under pressure completely filling said chamber, whereby the pressure of said medium is communicated to the liquid filling said cavity.

9. An electroacoustic transducer for use in a well bore or the like which contains a medium of varying pressure, comprising a supporting mandrel, a cylindrical element of electroacoustic transducing material mounted in surrounding relationship to said supporting mandrel to define an annular cavity therebetween, an annular spacer of non-conducting material surrounding said element, a flexible, impermeable metal sleeve surrounding said spacer and sealed at its upper and lower ends to said mandrel to provide a fluid-tight chamber including said annular cavity, said sleeve having a cross-section comprised of a plurality of arcuate segments joined by narrow, inwardly folded hinge portions, the outer surface of said sleeve being exposed to the pressure of said medium, and a liquid under pressure completely filling said chamber, whereby the pressure of said medium is communicated to the liquid filling said cavity.

References Cited by the Examiner

UNITED STATES PATENTS

| | | | |
|---|---|---|---|
| 2,251,817 | 8/41 | Athy et al. | 340—18 |
| 2,783,449 | 2/57 | Loofburrow | 340—17 |
| 2,868,311 | 1/59 | Tullos | 181—.5 |
| 3,018,466 | 1/62 | Harris | 340—8 |
| 3,056,464 | 10/62 | Marks | 181—.5 |
| 3,093,810 | 6/63 | Geyer et al. | 340—18 |

SAMUEL FEINBERG, *Primary Examiner.*

CHESTER L. JUSTUS, *Examiner.*